United States Patent [19]
Maxwell

[11] Patent Number: 6,123,319
[45] Date of Patent: Sep. 26, 2000

[54] DAMPER VALVE HAVING AN ADJUSTABLE SEAT

[75] Inventor: Ronald K. Maxwell, Irving, Tex.

[73] Assignee: Precision Engineered Products Inc., Grand Prairie, Tex.

[21] Appl. No.: 09/244,172

[22] Filed: Feb. 4, 1999

[51] Int. Cl.[7] .................................................. F16K 1/228
[52] U.S. Cl. ......................................... 251/307; 251/170
[58] Field of Search ..................................... 251/307, 306, 251/305, 314, 170, 192, 173, 175, 172; 137/246.22

[56] References Cited

U.S. PATENT DOCUMENTS

| | | |
|---|---|---|
| 2,083,154 | 6/1937 | Kinzie et al. . |
| 3,144,040 | 8/1964 | White . |
| 3,197,174 | 7/1965 | Killian . |
| 3,393,697 | 7/1968 | Fawkes . |
| 3,554,216 | 1/1971 | Piguet . |
| 3,814,380 | 6/1974 | Kormos et al. . |
| 4,006,883 | 2/1977 | Hilsheimer . |
| 4,220,314 | 9/1980 | Lynch . |
| 4,248,404 | 2/1981 | Goldman ................................. 251/307 |
| 4,398,696 | 8/1983 | Szilagyi et al. . |
| 4,582,080 | 4/1986 | Stock . |
| 5,327,928 | 7/1994 | Thomason . |
| 5,494,257 | 2/1996 | Maxwell . |

*Primary Examiner*—Kevin Shaver
*Assistant Examiner*—Eric Keasel
*Attorney, Agent, or Firm*—Venable; John P. Shannon

[57] ABSTRACT

A damper valve includes a base, a valve blade pivotally mounted on the base and two serially arranged valve seats. Each valve seat comprises adjustable valve seat portions on opposite sides of a pivot axis of the valve blade, the valve seat portions being positioned on opposite sides of the blade. Each valve seat portion includes a stationary member fixed to the base, an adjustable element movable relative to the stationary member, and bolts fixing the adjustable element to the stationary member. Adjustment devices are provided for moving each adjustable element toward the valve element to provide a precise fit along the entire length of the valve seat. The valve seats and the valve blade define an annulus which can contain gas at a higher pressure than the fluid controlled by the valve, so that none of the controlled fluid flows past the valve.

22 Claims, 5 Drawing Sheets

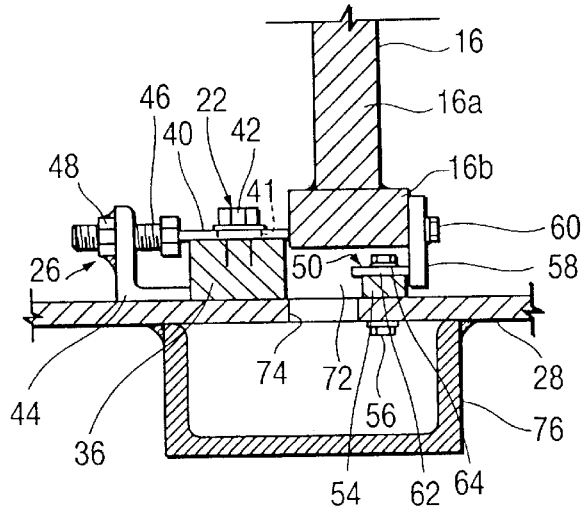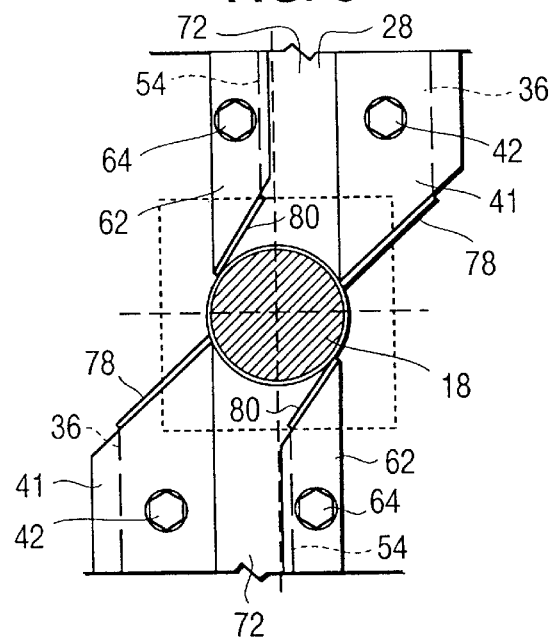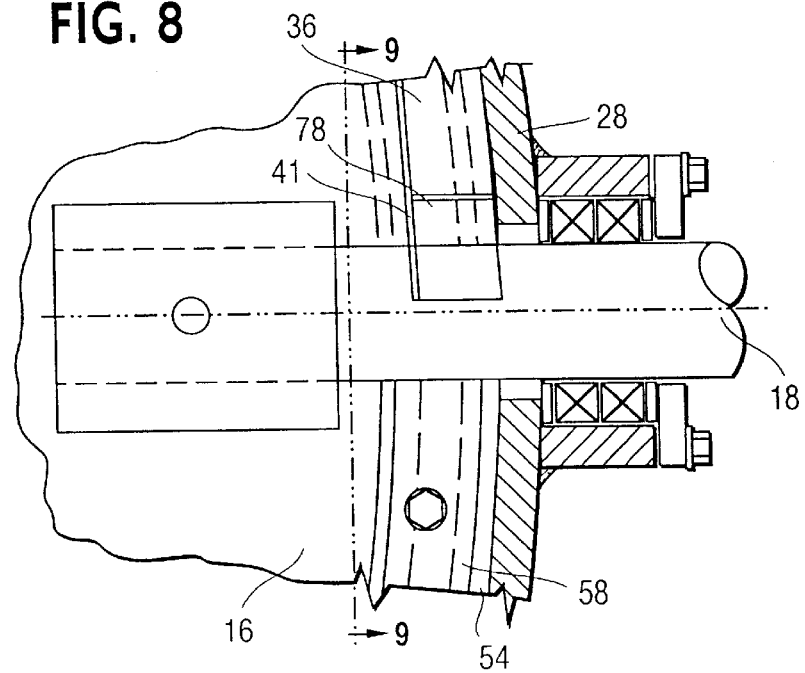

DAMPER VALVE HAVING AN ADJUSTABLE SEAT

BACKGROUND OF THE INVENTION

The present invention relates to valves having adjustable seats and, more particularly, to damper valves having seats which are variably adjustable.

Damper valves of the butterfly type are known in which a blade, usually of circular shape, is mounted for pivoting between an open position and a closed position to control the flow of fluid through the valve. A shaft about which the blade pivots is positioned diametrically with respect to the blade and is mounted for pivoting in bearings beyond the periphery of the blade. A curved blade seat is positioned in a valve body for side, that is, axial, engagement with one of the faces of the blade along the periphery of the blade.

The blade, the seat and the body can all be made of stainless steel and can be fabricated with precision. However, during handling, shipment and installation of the valves, the body can deform slightly, especially since the valves are large, typically having a diameter of several feet. Even a slight distortion, for example, on the order of less than 0.0001 inch, can have an adverse effect on the sealing ability of the valve.

The problem of loss of precise seating due to deformation of the body or other parts of the valve was overcome by the valve disclosed in U.S. Pat. No. 5,494,257 issued to the present inventor. More particularly, that patent discloses a valve with an arrangement for adjusting the seat along the length thereof to ensure a tight seal despite variations that might take place in the valve during shipping or installation, or at other times. The valve can be used with fluids at relatively high temperatures, for example, 800° F.

The arrangement of that valve includes a fixed seat member mounted on an inner surface of a valve body or base and having a side surface positioned for axial engagement with an overlapping portion of a side surface at the perimeter of the valve disk or blade. A portion of the seat on one side of the shaft is positioned on a first side of the blade, and a portion of the seat on the opposite side of the shaft is positioned on the frame for engagement with a second side of the blade. For each portion of the seat, an adjustable seat member is mounted on a surface of the fixed seat member facing the center of the frame, the adjustable seat member being movable axially relative to the fixed seat member, toward the valve blade, so that the adjustable seat member can be moved into engagement with any portion of the valve blade where the fixed seat member does not contact the blade. Bolts are provided at spaced locations along the lengths of the fixed valve seat member to secure the adjustable seat member to the fixed valve seat member when the desired precise positioning of the adjustable valve seat member has been achieved. A plurality of adjustment devices are spaced along the length of the seat and engage the adjustable seat members. Each adjustment device includes a threaded member, such as a bolt, engaging the adjustable seat member to move the adjustable seat member into sealing engagement with the blade at the needed places around the perimeter of the blade.

However, even with the improvements, there is a gas leakage through the valve which is more than an acceptable rate of leakage for some valve applications. As a result, it has been known to place two damper valves in series, each with its own blade and valve seat, in order to lower gas leakage to an acceptable level. In addition to greatly increasing cost, this practice greatly increases the space required for the installation of the valves in the conduit carrying the fluid to be controlled.

SUMMARY OF THE INVENTION

By the present invention, the leakage of gas through damper valves is further reduced by the use of two valve seats in series to define an annulus bounded by a single valve blade and the body of the valve. With such an arrangement, the differential in gas pressure across each of the seats in series is lower than the gas pressure across a single seat. As a result, the gas leakage through the valve is significantly less. In addition, the space taken up by the valve along the length of the duct in which the valve is installed is no greater than the space taken up by a similar valve having a single seat. Furthermore, the cost of a damper valve according to the present invention is much less than the cost of two single-seat valves. In order to provide zero gas leakage across the valve, the annulus can be purged with high pressure air to produce an air barrier across which a fluid having a lower pressure cannot flow.

The above objects are achieved by a valve arrangement including two valve seats arranged in series in the valve, each valve seat being in sealing engagement with the same movable valve element or blade and comprising a fixed seat member and an adjustable seat member. Each fixed seat member is mounted on an inner surface of the valve body or base and has a side surface positioned for axial engagement with an overlapping portion of a side surface at the perimeter of the valve disk or blade. Each adjustable seat member is mounted on a surface of a fixed seat member and is movable relative to the fixed seat member in a direction toward the blade. The adjustable seat members are relatively thin, from about 0.100 inches to about 0.200 inches in thickness, thereby increasing the seating pressures along the line of contact. As a result, effective sealing can be accomplished in almost all environments, including those characterized by solids accumulations or sticky substances. In some embodiments, a plurality of adjustment devices spaced along the length of the seat engage each adjustable seat member for moving the adjustable seat member and holding the adjustable seat member in a desired position on the fixed seat member.

The two seats in series define an annulus with the perimeter of the valve blade and have the effect of reducing the differential in fluid pressure across each of the two seats to a level below the fluid pressure differential of a single seat in the same application. The reduction in the gas pressure differential across each seat results in gas leakage through the valve being significantly less. The valve blade includes seal portions to define a seal with each of the valve seats.

The annulus defined between the blade, the valve body, and the two seats can be connected to a source of a high pressure gas, such as air, to produce a gas barrier. The pressure of the gas in the annulus is maintained at a level greater than the pressure of the gas on opposite sides of the blade. Where the annulus intersects the shaft upon which the blade pivots, closure elements are provided to engage the shaft and thereby reduce the leakage of the high pressure gas from the annulus.

BRIEF DESCRIPTION OF THE DRAWINGS

FIG. 7 is a cross section similar to FIG. 4, but of an alternate embodiment of the valve according to the present invention;

FIG. 8 is an enlarged detail of a shaft seal, seat and hub at the right side of the valve of FIG. 1, with the small valve seat portion removed;

FIG. 9 is a cross section taken along the line 9—9 in FIG. 8, with the small valve seat portion restored;

DETAILED DESCRIPTION OF THE PREFERRED EMBODIMENTS

Figure 1:
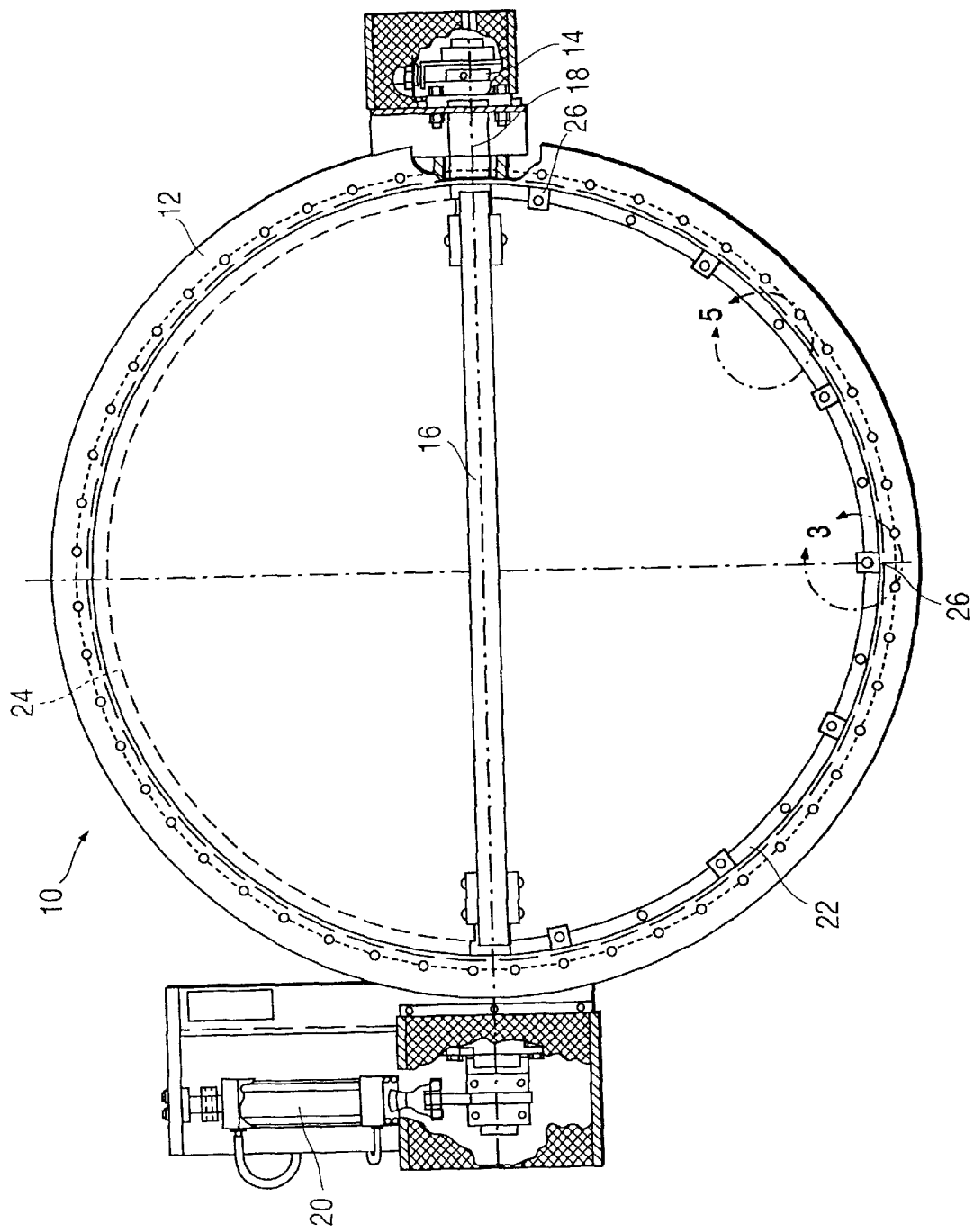
FIG. 1 is a front view of the valve according to the present invention, with the valve blade in an open position.

As can be appreciated from FIG. 1, the damper valve according to the present invention, which is designated generally by the reference numeral 10, includes a body or base 12 and bearings 14, one of which is shown, secured to the base 12. A circular valve element or blade 16 is positioned within the base 12, extending across most of the area of an inner circumference of the valve base. The blade 16 is secured to a shaft 18, which is mounted in the bearings 14 for pivoting movement relative to the base 12. A fluid pressure cylinder 20 is mounted on an exterior side of the base 12 and connected to an end of the shaft 18 for pivoting the shaft and, thereby, moving the valve blade 16 between open and closed positions.

A first valve seat includes two portions 22 and 24, both mounted on an interior surface of the base 12, one portion 22 being mounted on one side of the valve blade 16, and the other portion 24 being mounted on the opposite side of the valve blade. Seat adjustment devices 26 are mounted on an inner surface of the base 12 at intervals along the length of the valve seat portions 22 and 24. In FIG. 1, the valve seat portion 24 is shown in phantom and the seat adjustment devices associated with the valve seat portion 24 are not shown.

Figure 2:
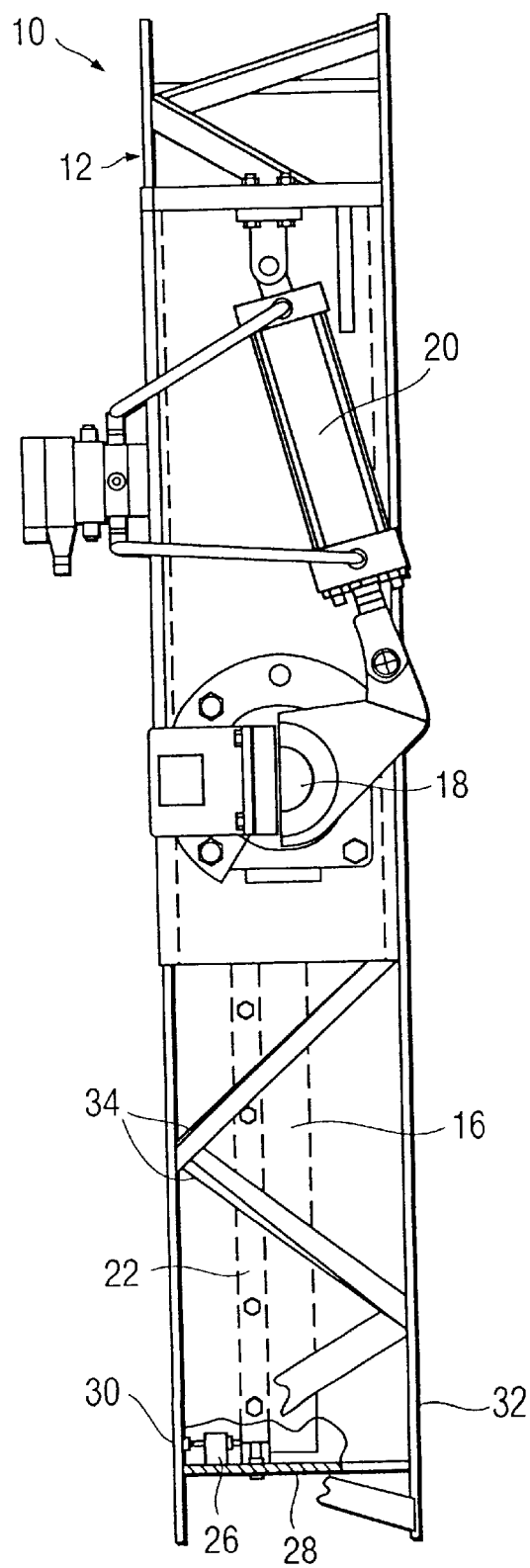
FIG. 2 is a side view of the valve of FIG. 1, but with the valve blade in the closed position.

As can be seen in FIG. 2, the base 12 comprises a frame including a cylinder 28, radially extending flanges 30 and 32 secured at axial ends of the cylinder 28, and struts 34 connected between the flanges 30 and 32.

Figure 3:
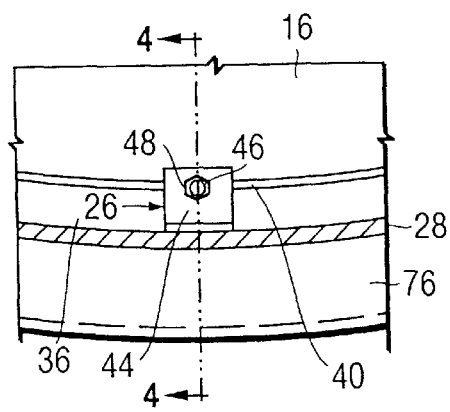
FIG. 3 is an enlargement of the portion of the valve within the circle 3 in FIG. 1, showing an adjustment device for one of the valve seats, with a flange of the frame removed and the valve blade in the closed position.
Figure 4:
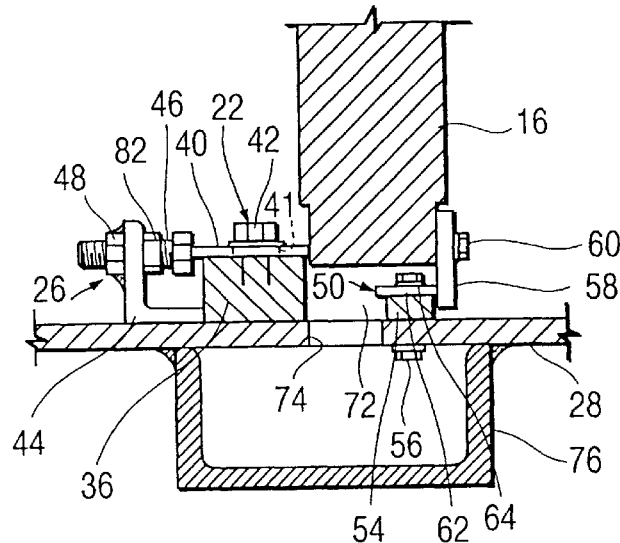
FIG. 4 is a cross section taken along the line 4—4 in FIG. 3.

As can best be seen from FIGS. 3 and 4; the valve seat portion 22 includes a stationary member 36 fixed by, for example, welding to the cylinder 28, which is part of the valve base 12. A side of the stationary member 36 facing the blade 16 is machined for a precise fit with a side surface of the outer periphery of the blade, which is also machined. The stationary member 36 has a length parallel to the circumference of the cylinder 28, and the stationary member is curved to conform to the inner circumference of the cylinder. The valve seat portion 22 also includes an adjustable element 40 secured to the circumferentially inner surface of the stationary member 36 and having a width greater than the width of the stationary member. The adjustable element 40 has a radial dimension, or thickness, considerably smaller than that of the stationary member 36 and has a plurality of slots 41 extending parallel to the width of the adjustable element. The adjustable element 40 is secured to the stationary element 36 by a plurality of capscrews 42, a capscrew 42 extending through each of the slots and into a threaded opening in the stationary element to secure the adjustable element to the stationary member when the desired position of the adjustable element relative to the stationary member has been attained. Typically, the slots 41 have a length of ¾ inch. The slots 41 and the capscrews 42 make the adjustable element 40 adjustable. A side of the adjustable element 40 facing the blade 16 is machined for precise engagement with the side of the blade. A side of the adjustable element 40 facing away from the blade 16 is engaged by an adjuster comprising the adjustment devices 26. Although the foregoing description has been made in connection with the valve seat portion 22, it is understood that the valve seat portion 24 has the same structure.

Each adjustment device 26 includes a base member 44, a threaded aperture associated with the base member 44 and a threaded element 46 cooperating with the threaded aperture. In the embodiment of FIG. 4, the threaded aperture is contained in a nut 48 welded to a side of the base member 44. With this arrangement, the base member 44 has a bore in alignment with the threaded aperture in the nut 48 and large enough that the threaded element can be slid axially through the bore. The threaded element 46 is a bolt whose head is in engagement with the adjustable element 40.

Figure 5:
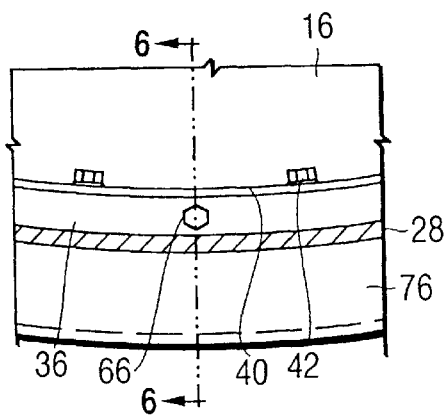
FIG. 5 is an enlargement of the portion of the valve within the circle 5 in FIG. 1, showing an adjustment device for the other of the valve seats, with a flange of the frame removed and the valve blade in the closed position.
Figure 6:
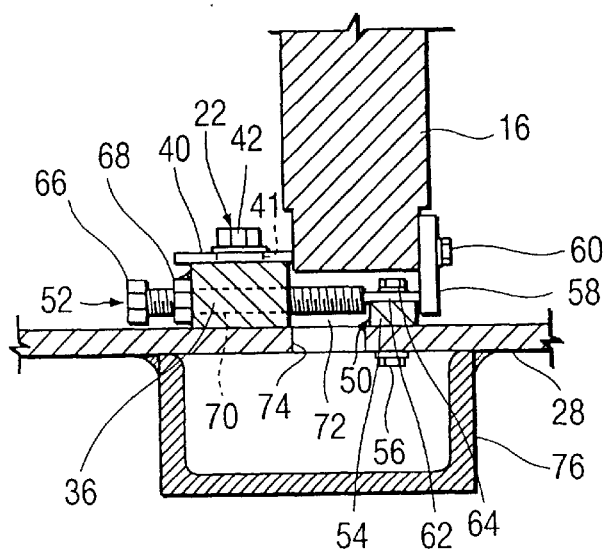
FIG. 6 is a cross section taken along the line 6—6 in FIG. 5.

As can be seen from FIGS. 1, 5 and 6, a second valve seat includes two portions, both mounted on an interior surface of the base 12, one valve seat portion 50 being mounted on one side of the valve blade 16, parallel to and spaced from the valve seat portion 22 of the first valve seat. The other valve seat portion (not shown) of the second valve seat is mounted on the opposite side of the valve blade 16 of the second valve seat is mounted on the opposite side of the valve blade 16 from the valve seat portion 50, and parallel to and spaced from the valve seat portion 24 of the first valve seat. Seat adjustment devices 52 are mounted on an inner surface of the base 12 at intervals along the length of the first and second valve seat portions, spaced along that length from the seat adjustment devices 26 for the first valve seat.

As can best be seen from FIGS. 5 and 6, the valve seat portion 50 is positioned between the cylinder 28 and the periphery of the main body of the valve blade 16 in a direction parallel to the central plane of the valve blade when the valve blade is in a closed position. The valve seat portion 50 includes a stationary member 54 fixed by a plurality of bolts 56 to the cylinder 28. The valve blade 16 includes a sealing flange 58 connected by bolts 60 to the side of the main body of the valve blade 16 opposite to the side engaged by the stationary member 36 and the adjustable element 40 of the first valve seat. The sealing flange 58 extends the length of the valve seat portion 50 of the second valve seat and projects into the space between the cylinder 28 and the rest of the valve blade 16 for engagement by the second valve seat. A side of the stationary member 54 facing the sealing flange 58 is machined for a precise fit with a side surface of the sealing flange which is also machined. The stationary member 54 has a length parallel to the circumference of the cylinder 28, and the stationary member is curved to conform to the inner circumference of the cylinder. The second valve seat portion 50 also includes an adjustable element 62 secured to the circumferentially inner surface of the stationary member 54 and having a width greater than the width of the stationary member. The adjustable element 62 has a radial dimension, or thickness, considerably smaller than that of the stationary member 54 and has a plurality of slots (not shown) extending parallel to the width of the adjustable element, like the slots 41 of the adjustable element 40. The adjustable element 62 is secured to the stationary element 54 by, for example, welding. A capscrew 64 extends through each of the slots to secure the adjustable element to the stationary member when the desired position of the adjustable element relative to the stationary member has been attained. A side of the adjustable element 62 facing the sealing flange 58 is machined for precise engagement with the sealing flange. A side of the adjustable element 62 facing away from the sealing flange 58 is engaged by the adjustment devices 52. Although the foregoing description has been made in connection with the valve seat portion 50, it is understood that the unillustrated valve seat portion of the second valve seat has the same structure.

Each adjustment device 52 includes a threaded aperture associated with the stationary member 36 of the first valve seat and a threaded element 66 cooperating with the threaded aperture. In the embodiment of FIGS. 5 and 6, the threaded aperture is contained in a nut 68 welded to a side of the stationary member 36 facing away from the valve blade 16. With this arrangement, the stationary member 36 has a bore 70 in alignment with the threaded aperture in the nut 60 and large enough that the threaded element can be slid axially through the bore. The threaded element 66 is a bolt whose head is oriented distal to the valve blade 16. The end of the bolt opposite to the head extends into the space between the cylinder 28 and the main body of the valve blade 16 and into engagement with the adjustable element 62 of the second valve member.

The cylinder 28, the valve blade 16 when it is closed, and the first and second valve seats define a chamber 72 for containing a gas, such as air, under a pressure greater than the pressure of the fluid controlled by the damper valve 10. Each chamber 72 extends around substantially half of the perimeter of the valve blade 16 from the portion of the shaft 18 extending through one side of the blade 16 to the portion of the shaft 18 extending through the opposite side of the blade 16. One of the chambers 72 extends along the top of the blade 16 and the other chamber 72 extends along the bottom of the blade 16, when the blade 16 is closed. With this arrangement, the ability of the damper valve 10 of the present invention to prevent leakage past the valve of the fluid the valve controls is further enhanced. Gas under pressure is communicated to the chamber 72 through at least one opening 74 in the cylinder 28 from an external gas supply plenum defined by a plenum member 76 secured to the exterior of the cylinder 28.

As can be seen from FIG. 7, in one alternate embodiment, a damper valve 10 of the present invention, a valve blade 16 has a main portion 16a, to which a rim 16b is secured, for example, by welding. The rim 16b is thicker than the main portion 16a. The first valve seat engages and seals with the rim 16b, and the rim 16b can be machined for precise seating. In addition, the sealing flange 58 is secured to the rim 16b. In all other respects, the embodiment of FIG. 7 is the same as the embodiment of FIGS. 1–6.

Figure 10:
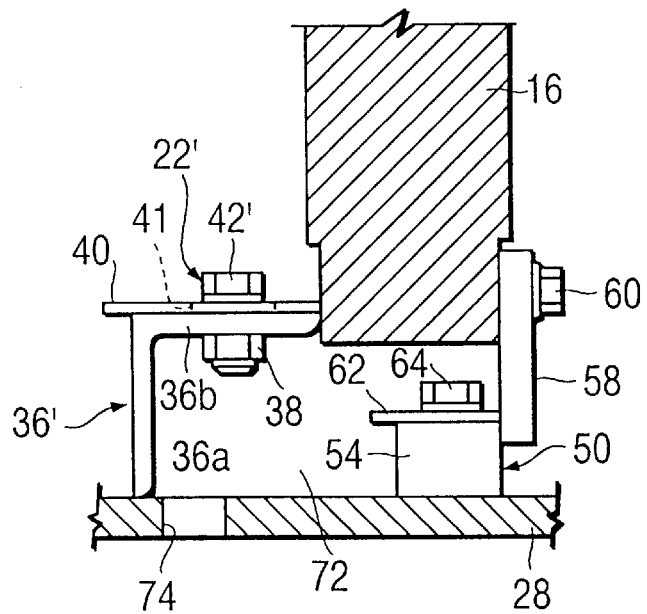
FIG. 10 is a cross section similar to FIG. 4, but of another embodiment of the valve according to the present invention.

As can be seen from FIGS. 9 and 10, where the chamber 72 intersects with the shaft 18, closure seats 78 and 80 in the form of plates welded to the ends of the stationary members 36 and 54, respectively, engage the circumference of the shaft 18 to form seals at the ends of the chamber 72.

As can be seen from FIG. 10, the stationary member 36' of the valve seat portion 22' can comprise an angle member having a first leg 36a perpendicular to and fixed to the cylinder 28 by, for example, welding. A second leg 36b defines a support for the adjustable element 40 and defines the slots 41 for receiving bolts 42' to which nuts 38 are secured.

The adjustment devices 26 and 52 have been omitted from the embodiment of FIG. 10, although they can be provided if desired. The plenum member 76 is also omitted. Instead, the gas under pressure is fed directly to the chamber 72 through the opening 74 in the cylinder 28. As an option, the plenum member 76 can be used with the embodiment of FIG. 10. In all other respects, the embodiment of FIG. 10 is the same as the embodiment of FIGS. 1–6.

Figure 11:
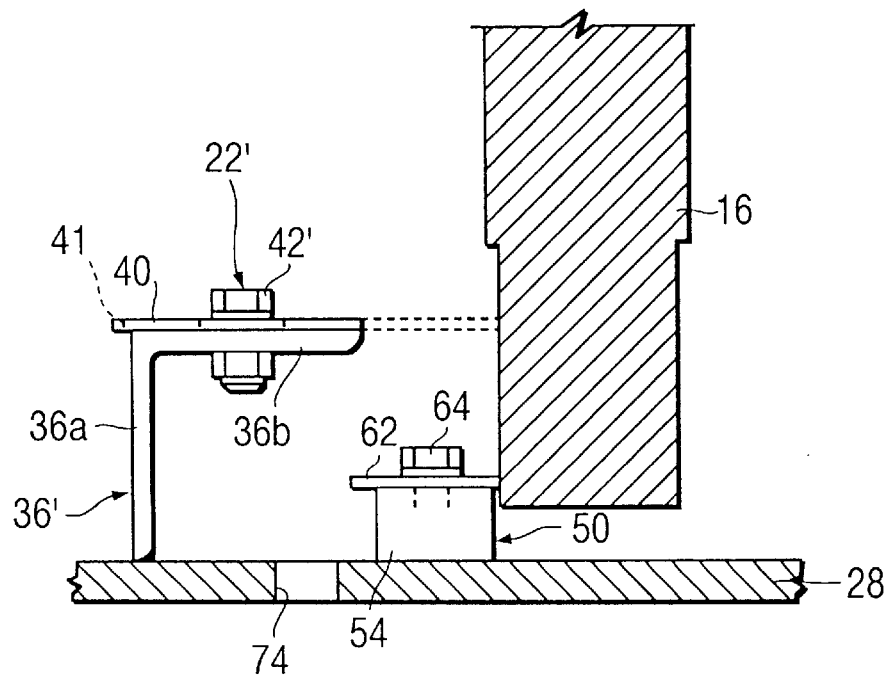
FIG. 11 is a cross section similar to FIG. 4, but of yet another embodiment of the valve according to the present invention.

The embodiment of FIG. 11 is like the embodiment of FIG. 10, except that the valve-seat portion 50 of the second valve seat is positioned under the adjustable element 40 of the first valve seat. Thus, the first and second valve seats are in alignment with one another in a direction parallel to the central plane of the valve blade 16 when the valve blade is in a closed position. The second valve seat forms a seal with a side of the main body of the valve blade 16. When the valve blade is in its closed position, the stationary member 36 is spaced from the valve blade sufficiently, about 1 inch, to allow tools, such as a wrench and a crowbar, to be inserted between the stationary member and the valve blade. With such a space, the adjustable element 40 can be in a position, shown in solid lines in FIG. 11, in which the adjustable element is also spaced from the valve blade 16. In that position of the adjustable element 40, a ratchet wrench is inserted in the space to loosen the capscrews 64 fixing the adjustable element 62 in place on the stationary element 54. A crowbar is inserted into the space to lever the adjustable element 62 into contact with the valve blade 16, and the capscrews 64 are tightened. The adjustable element 40 is moved relative to the stationary member 36' to the position shown by the dashed lines to engage the valve blade 16. The bolts 42' are tightened to fix the adjustable element 40 in its seating position.

As can be appreciated from, for example, FIG. 4, during manufacture, the valve seat portions 22 and 24 are precisely fixed in place using the capscrews 42 to provide precise engagement between the facing machined faces of the stationary members 36 and the blade 16. When the damper valve 10 has been installed, the fit between the valve seat portions 22 and 24 and the blade 16 are checked along the entire length of the valve seat portions. If any gaps are detected, the capscrews 42 are slightly loosened and the threaded element 46 turned to move the adjustable member 40 into engagement with the face of the blade 16 where there had been a gap. This is done on the adjustment device or devices 26 lying closest to the gaps. When precise engagement is provided, the capscrews 42 are tightened and, where a lock, such as a jamb nut 82, is used on the threaded element 46, the jamb nut is also tightened against the base member 44, to lock the adjustable member 40 in position. This procedure is followed for all gaps along the lengths of the valve seat portions 22 and 24.

Having thus described the present invention and its preferred embodiments in detail, it will be readily apparent to those skilled in the art that further modifications to the invention may be made without departing from the spirit and scope of the invention as presently claimed.

What is claimed is:

1. A damper valve for controlling the flow of fluids through a conduit, comprising:

a base;

a valve element having sealing portions, a periphery and a central plane extending through the periphery; and two valve seats arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats, wherein the base, the valve element, and the valve seats define a chamber, and the damper valve further comprises gas in said chamber at a pressure greater than the pressure of the fluids in the conduit, and wherein said valve element is mounted on said base for pivoting movement by a shaft, said chamber intersects with said shaft, and a closure seat on said stationary member engages the shaft to form a seal with the shaft.

2. A damper valve for controlling the flow of fluids through a conduit, comprising:

a base;

a valve element having sealing portions, a periphery, and a central plane extending through the periphery; and two valve seats mounted on said base and arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats.

3. The damper valve of claim 2, wherein both of said valve seats are adjustable.

4. The damper valve of claim 3, wherein each said adjustable valve seat comprises a stationary member and an adjustable element mounted for movement relative to said stationary member.

5. The damper valve of claim 2, wherein said valve seat further comprises an arrangement for fixing said adjustable element to said stationary member in a desired position.

6. A damper valve for controlling the flow of fluids through a conduit, comprising:

a base;

a valve element having sealing portions, a periphery, and a central plane extending through the periphery; and two valve seats arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats, the damper valve, further comprising an adjuster for moving said adjustable valve seat, by engaging the adjustable valve seat, in a direction generally perpendicular to said central plane when said valve element is in the closed position.

7. The damper valve of claim 6, wherein said adjuster moves said adjustable element into contact with one of the sealing portions of said valve element when said valve element is in the closed position.

8. The damper valve of claim 7, wherein said adjustable element has a side facing said valve element and a side facing away from said valve element, and said adjuster moves said adjustable element by engaging the side of the adjustable element facing away from said valve element.

9. The damper valve of claim 6, wherein said adjustable valve seat has a length, and said adjuster comprises a plurality of adjusting devices spaced from one another in a direction parallel to the length of said adjustable valve seat.

10. The damper valve of claim 9, wherein each said adjusting device comprises a base member, a threaded aperture associated with said base member, and a threaded element cooperating with said threaded aperture, said threaded element being engageable with said side of said valve seat facing away from said valve element.

11. The damper valve of claim 10, further comprising a lock for locking each said threaded element in a desired position.

12. The damper valve of claim 6, wherein said adjuster comprises a base member, a threaded aperture associated with said base member, and a threaded element cooperating with said threaded aperture, said threaded element being engageable with said side valve seat facing away from said valve element.

13. The damper valve of claim 12, further comprising a lock for locking said threaded element in a desired position.

14. The damper valve of claim 6, wherein at least a first of said two valve seats includes a stationary member, the second of said two valve seats is adjustable, and said adjuster comprises an engagement element extending through the stationary member of said first of said valve seats and into engagement with said second of said valve seats.

15. The damper valve of claim 14, wherein said engagement element is a threaded element, and said adjuster further comprises a base member, a threaded aperture associated with said base member, said threaded element being in operative engagement with said threaded aperture.

16. The damper valve of claim 14, wherein said second of said valve seats includes a stationary member and an adjustable element mounted for movement relative to said stationary member, and said engagement element engages said adjustable element.

17. A damper valve for controlling the flow of fluids through a conduit, comprising:

a base;

a valve element having sealing portions, a periphery, and a central plane extending through the periphery; and two valve seats arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats, and wherein one of the sealing portions of the valve element is defined on a discrete sealing member extending radially beyond the rest of the valve element, and one of said valve seats defines a seal with said radially extending sealing portion.

18. The damper valve of claim 17, wherein one of said valve seats is positioned between said rest of the valve element and said base in a direction parallel to the central plane of the valve element when the valve element is in the closed position.

19. A damper valve for controlling the flow of fluids through a conduit, comprising:

a base;

a valve element having sealing portions, a periphery and a central plane extending through the periphery; and two valve seats arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats, and wherein said valve seats are in alignment with one another in a direction parallel to the central plane of the valve element when the valve element is in the closed position.

20. The damper valve of claim 19, wherein said valve seats seal with said valve element along sealing lines, the sealing line of a first of said valve seats is located farther from said base than the sealing line of the other valve seat, said first valve seat has a stationary member and an adjustable element mounted for movement relative to said stationary member, and said stationary member is spaced from said valve element sufficiently to permit engagement of said other valve seat with a tool when said valve element is in a closed position.

21. The damper valve of claim 19, wherein the valve element further has opposite sides, and both of said valve seats sealingly engage the same one of said opposite sides of the sealing element.

22. A damper valve for controlling the flow of fluids through a conduit, comprising:

a base;

a valve element having sealing portions, a periphery, and a central plane extending through the periphery; and two valve seats arranged serially with respect to the flow of the fluids, said valve seats defining seals with said valve element, at least one of said valve seats being an adjustable valve seat including a stationary member and an adjustable element mounted for movement relative to said stationary member, wherein said valve element is mounted on said base for pivoting movement into a closed position in which said sealing portions of said valve element are in sealing engagement with said valve seats, and both of said valve seats are adjustable, the damper valve further comprising an adjusting arrangement for moving both of said adjustable valve seats in a direction generally perpendicular to said central plane when said valve element is in the closed position.

* * * * *